July 13, 1954 W. I. GLADFELTER ET AL 2,683,340
BLASTING APPARATUS AND CLAMPING MECHANISM THEREFOR
Filed April 10, 1952 3 Sheets-Sheet 3

INVENTORS
WILTIE I. GLADFELTER
RALPH R. GARVER
BY
Arthur G. Connolly
ATTORNEY

Patented July 13, 1954

2,683,340

UNITED STATES PATENT OFFICE 2,683,340

BLASTING APPARATUS AND CLAMPING MECHANISM THEREFOR

Wiltie I. Gladfelter, Waynesboro, Pa., and Ralph R. Garver, Hagerstown, Md., assignors to Pangborn Corporation, Hagerstown, Md., a corporation of Maryland Application April 10, 1952, Serial No. 281,558

6 Claims. (Cl. 51—217)

This invention relates to blasting apparatus in which articles are exposed to a stream of abrasive particles for cleaning or graining their surfaces. The invention is particularly concerned with a clamping mechanism for holding the articles so that they are suitably exposed to the blasting stream.

When metal sheets are blasted, as for example to suitably grain a surface for lithographic printing purposes, it has become standard to mount the sheets on a rotatable, cylindrical holder and to rotate the sheets on the holder in the path of a stream of blastant emitted by a projector that is arranged to sweep axially across the exposed surface of the sheet. Such constructions are shown for example in the Lindmark patents, No. 2,495,269 and No. 2,516,222, and in general are capable of effecting a highly uniform graining. Such machines are handicapped, however, by the fact that the sheets are awkward to clamp in place and prior clamping mechanisms require a relatively large amount of manipulation to provide secure anchorage of the sheets, and very frequently jam by reason of the collection of blastant particles between relatively movable parts of the mechanism, for example.

Among the objects of the present invention is the provision of novel blasting apparatus and clamping means therefor, which avoid the above and related disadvantages. These, as well as additional objects of the present invention will be more readily understood from the following description of several of its exemplifications, reference being made to the accompanying drawings, wherein.

According to the present invention a blasting apparatus for subjecting sheets to the action of abrasive particles, includes a cylindrical drum rotatably mounted on an axially positioned shaft, at least one clamp bar adjustably held in axially-directed position against the drum exterior, an expandible tube held by each bar close to the external drum surface, each bar having a backing wing supporting its tube on the side opposite the drum surface, fluid supply structure connected to said tube for supplying it with fluid at elevated pressure, said supply structure including manipulatable control means connected to establish the fluid supply and thereby cause the tube to be expanded and tightly grip a portion of a sheet inserted between it and the carrier, operating mechanism connected to rotate the drum around its axis, and blast projecting elements positioned to direct a stream of blastant at the rotating drum exterior to blast sheets that are gripped against it. The fluid supply structure can advantageously include a supply manifold extending around the shaft, secured to the drum for rotation therewith, and having a plurality of peripherally distributed outlets, and a selectable connection linkage can be provided to connect any of the outlets to tubes located anywhere around the drum periphery.

Figure 1:
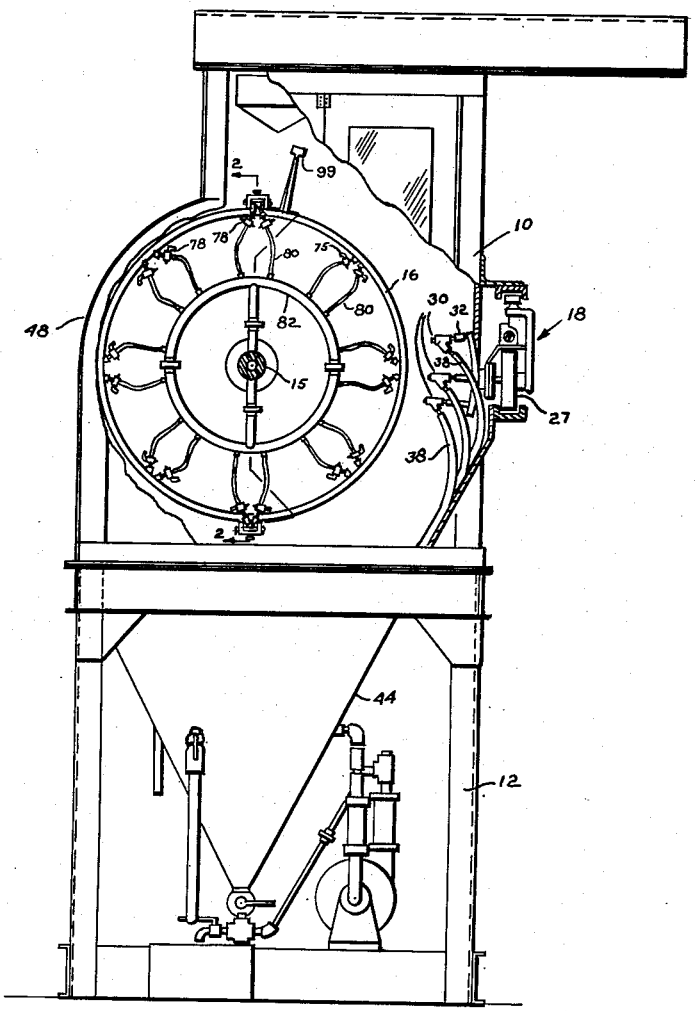
Fig. 1 is a side elevation with parts in section, showing one form of blasting apparatus in accordance with the present invention.

Referring to Fig. 1, the blasting apparatus here shown includes a housing 10 supported on legs 12 and enclosing a drum 16 which is suitably supported for rotation as by mounting it on an axially positioned shaft 15. The housing has an open front 48 through which access is had to the drum. In the rear of the housing is secured a traversing mechanism indicated generally at 18 and arranged to move to and fro carriage 27 which carries a set of blasting nozzles 30, shown as three in number. These nozzles are connected as by hoses 32 and 33 to suitable sources of blastant material, some or all of which may be held in a hopper 44 provided at the bottom of the housing.

The particular manner of providing the blastant stream and traversing it across the drum forms no part of the present invention and will accordingly not be further described herein. However, for a more complete description of a suitable form of apparatus reference may be made to copending Gladfelter and Garver application, Serial No. 189,210 filed October 9, 1950.

Figure 2:
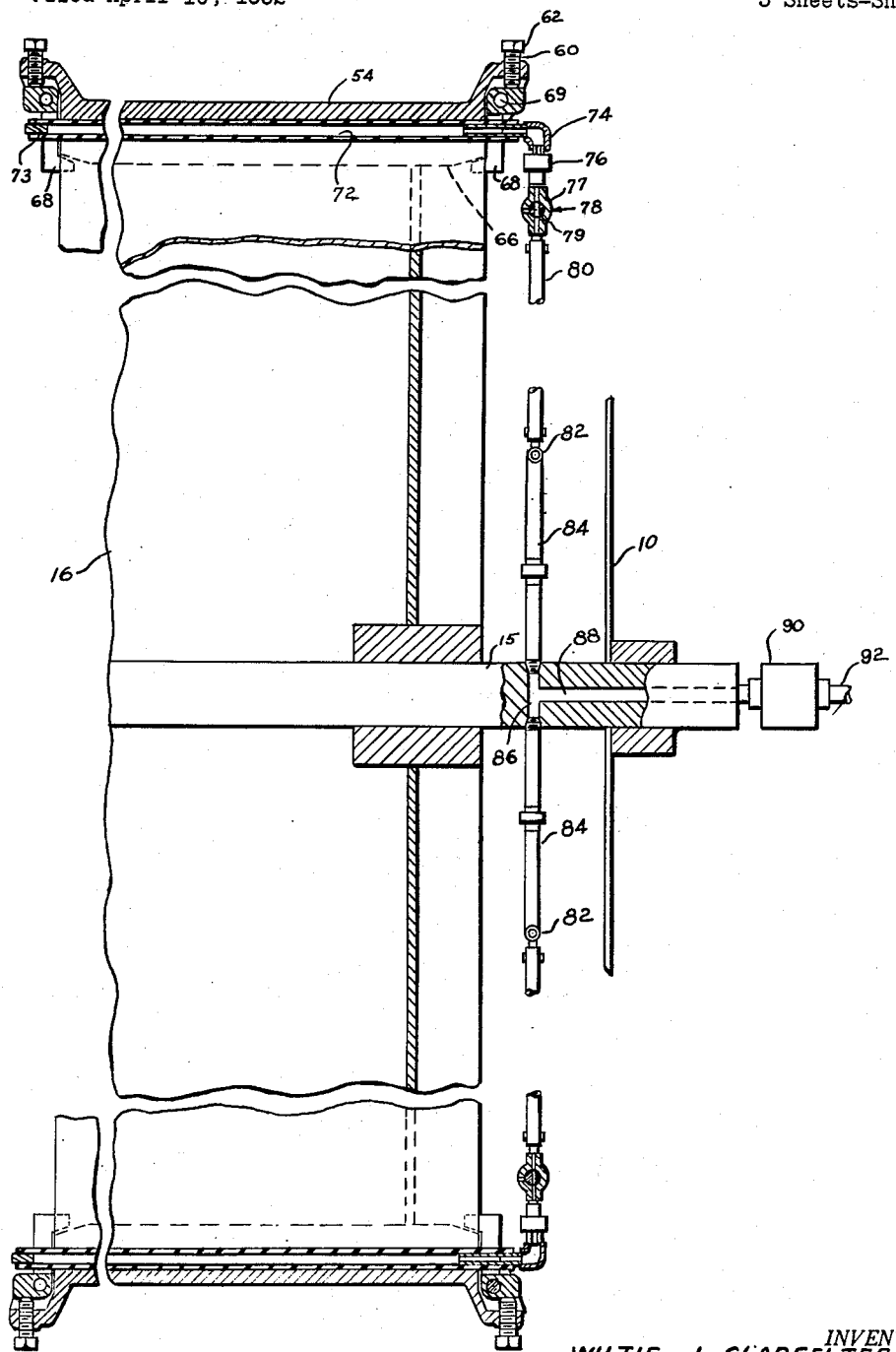
Fig. 2 is an enlarged sectional detail view of a portion of the apparatus of Fig. 1, taken along the line 2—2, with parts broken away.
Figure 3:
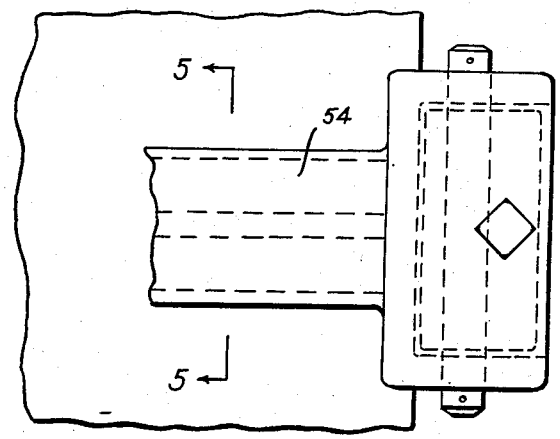
Fig. 3 is an enlarged plan view of a portion of the clamping mechanism shown in Figs. 1 and 2.

For holding sheets on the drum, it is provided with a clamping mechanism shown in greater detail in Fig. 2. This mechanism includes a clamping bar 54 that extends axially the length of the drum 16, and at each end is provided with clamping jaws 68 which project laterally of the bar and are positioned for engaging under a flange 66 that extends as a skirt from the external cylindrical face of the drum. Either or both of these jaws 68 can be pivotally held as for example on pivot pins 69 received in the ends of the bar, and can be securely locked in clamping position by means of a jam screw 60. The screws 60 can either be of the manually operated types, such as a wing or thumb screw, or they can be designed for operation by wrenches as by providing them with a standard type of wrench engaging head 62.

Figure 4:
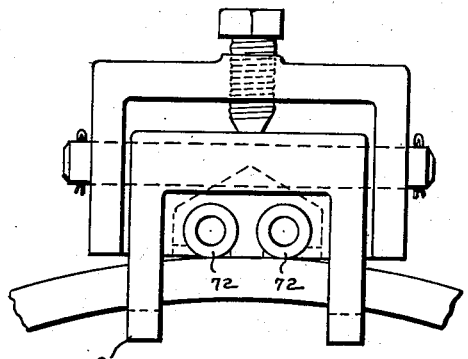
Fig. 4 is an enlarged side view similar to that of Fig. 1 of the portion of the clamping mechanism shown in Fig. 3.
Figure 5:
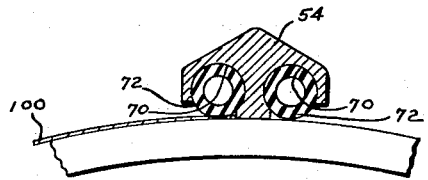
Fig. 5 is a sectional view of the mechanism of Fig. 3 taken along the line 5—5.

As more clearly shown in Figs. 4 and 5, the bar 54 has a pair of grooves 70 extending along its length and opening in a direction facing the jaws 68. Within each of these grooves there is placed an expansible tube 72 which may also extend along the entire length of the drum. These tubes can be of any convenient material such as rubber, either natural, synthetic, or modified as for example rubber hydrochloride, plastic, such as resins of the polyvinyl chloride type, or can be of the coated fiber form, or they can be of laminated construction with fiber used as some or all of the laminations. In fact, substantially any hose other than a rigid one will be suitable.

One end of the hose is connected as by elbow-fitting 74, a quick-acting connection 76, and a control valve 78 to a conduit 80 which in turn leads to a generally circular manifold 82 that extends around shaft 15. The manifold is shown as having a pair of radial connectors 84 which connect it with a diametrical passageway 86 drilled through shaft 15. Another passageway 88 drilled axially through shaft 15 establishes communication between passageway 86 and the end of the shaft where a rotating conduit joint 90 is affixed. Manifold 82 and all direct connections to it rotate with the shaft 15 and drum 16, but the rotating joint 90 has an outer conduit 92 which is fixed in place and can be coupled to any desired source of fluid under pressure, as for example a compressed air tank or supply.

The ends of tubes 72 opposite the connector 74 may simply be plugged, as shown for example by plug 73, or they can be provided with connections to one or more other tubes so that the tubes can be operated as a group.

Control valves 78 are shown as of the three-way type having a valve body 77 with a plurality of outwardly opening ports and a rotatable cock 79 provided with suitably arranged passageways. The cock 79 is provided with a handle 75 by which it can be readily manipulated into any desired position. In one position, as shown for example in Fig. 2, the valve establishes fluid connection from line 92 to tube 72. Rotation of the cock by about 45° cuts off all connection and seals the fluid in tube 72. Counterclockwise rotation of the cock 79 by an amount 90° from the position shown at the top of Fig. 2, opens tube 72 to the atmosphere while line 92 is kept closed. This exhausts any compressed fluid from tube 72. Only the fluid inflow and fluid discharge position of the valve are needed and the remainder of the cock rotation can be prevented as by the conventional stop mechanism.

As shown more clearly in Fig. 1, the manifold 82 may have a plurality of conduits 80 extending out from its periphery at spaced intervals, so that the tubes of an anchoring bar 54 may be conveniently connected to the manifold through any of these conduits regardless of its position along the drum periphery. Although two anchoring bars 54 are shown in Figs. 1 and 2 at opposite portions of the drum, the bars can be shifted around as desired, or more bars can be used, in accordance with the lengths of the sheets that are being blasted.

In operation, with the drum 16 stationary, the tubes 72 all exhausted and with the valves 78 preferably set in position to close off all outlets from the manifold 82, a metal sheet 100 can be introduced into the housing 10 through opening 48 and one edge of this sheet is slipped under a clamping bar 54 so that it finds its way under a tube 72, as shown in Fig. 5 for example. The valve 78 connected to that tube can then be manipulated to permit fluid under pressure to enter the tube. This expands the tube and causes it to press tightly against the outer surface of the drum, thereby securely gripping the end of the sheet in place. The entire sheet can now be wrapped around the drum and its opposite end similarly inserted under another tube in the same or a different anchoring bar 54. If necessary, the anchoring bars can be shifted so as to be properly positioned to receive the opposite sheet end.

Instead of clamping one end under a fluid-applied pressure before the second end of the sheet is inserted in place, the application of the fluid pressure can be deferred until both ends of the sheet are mounted. Where the sheet is relatively long, it may be necessary to rotate the drum 16 after one end is positioned, to bring the drum around to where the sheet can be entirely wrapped around it.

The above clamping arrangement can be utilized with sheets of substantially any length up to a maximum that is just slightly less than the periphery of the cylindrical drum surface. With such large sheets it is only necessary to use a single clamping bar with the ends of the sheet held in the respective tubes with which that bar is fitted.

To simplify the mounting of the plates on the drum, the tubes 72 and bars 54 are so arranged that when the tubes are entirely deflated, there is not sufficient clearance between the tubes and the external drum surface for plates to be loosely slid in place. This lack of clearance provides frictional resistance against the entry of the plates, and also frictionally holds these plates in place when their ends are positioned under the tubes even though no fluid pressure is used. This frictional holding need not be sufficiently strong to withstand the centrifugal and blasting forces to which the plates are subjected during the graining operation itself. The friction will, however, act to keep one or both ends of each plate properly fitted under the clamping bars until some or all of the plates are mounted and the fluid pressure is applied.

One suitable technique for operating the clamping apparatus is to leave one clamping bar fastened to the drum and with the pressure released, one end of one or more plates can then be pushed under the expandable tubing on one side of that bar so as to provide sufficient plates to extend across the usable width of the drum. All of these plates should extend over substantially the same distance around the drum periphery, that is, have substantially the same length. A second clamping bar can then be mounted on the drum in a position that brings its clamping tube over the opposite ends of this row of plates. After each end of these plates is held in place, the corresponding valves 78 can be manipulated to inflate the respective tubes. Alternatively, both valves can be operated together after both ends of the plates are mounted.

If there is still sufficient room on the drum, another row of plates can then be fitted in place in the corresponding manner, followed by a third and fourth row, if space is available. Where necessary, the drum can be rotated slightly to bring the mounting portion close to the loading opening 48 through which the plates are inserted to bring them onto the drum.

After the graining operation is completed, the plates can be unloaded by reversing the above procedure, that is, one clamp can be removed after its holding pressure is released, following which the plates thus freed at one of their ends can be unfastened at their other ends by release of pressure at the corresponding tube. This row of plates can then be pulled out from under the clamp carrying that tube, and removed. This clamp can then be unfastened and slipped off the drum, first releasing the pressure on the remaining tube, to permit the following row of plates to be removed, etc. Instead of completely removing the clamp bars from the drum, they can merely be slid along the drum periphery sufficiently far to permit the desired plate removal.

If desired, however, the loading and unloading can be effected by merely operating the fluid pressure controls, without moving or removing any of the clamps. For this purpose, a row of plates can be inserted under one deflated tube of one bar, and then bowed so that the opposite ends of these plates can be brought up and pushed under the clamping tube of the next bar. After this mounting, the pressure controls can be operated to clamp the row in place along one or both of its sides. Other rows can then be affixed in the same way. For removing plates without loosening or disengaging the clamps from the drum, the side edges of the plates can be lifted up by the operator's fingers after the fluid pressure is released, the operator's fingernails catching under the plates and providing a suitable grip. In addition, the drum periphery can be provided with grooves to simplify the gripping of the plate in this manner. Grooves of this type can extend in an axial direction along the external drum surface at suitable intervals, or if desired can be tilted as for example in the form of grooves helically extending around the drum periphery.

Instead of having pressure controls disposed as shown in the above figures, these controls can be re-arranged and/or re-located in any other manner so long as they provide the desired operation.

Tubes 80 are preferably of the flexible type such as the fabric and fabric-rubber tubes described above. This permits them to bend and be readily connected along any part of a substantial span of the drum periphery. The drum can also be provided with anchoring mechanism such as a set of clips in which unused tubes 80 can be frictionally held so that during drum rotation they do not move about and cause any disturbance.

The tube-holding grooves 70 in the anchoring bars 54 need not be as deep as that shown in Fig. 5. In fact, the tubes need only be backed by a short, flat rib projecting from the body of anchoring bar 54. Even though such backing leaves a considerable portion of the tubes 72 exposed for expansion in directions other than that against the surface of drum 16, a sufficiently secure clamping is thereby still provided.

A feature of the present invention is the fact that the clamping bar and tube combination is not adversely affected by the blasting operations, and presents no parts that can be jammed by blastant particles. It will be noted in this connection that as the drum 16 rotates during the blasting, the clamping bars 54 are repeatedly carried through the vigorous blastant stream. In fact, by reason of the height of the clamping bars, they are appreciably closer to the blast nozzles than the drum itself and accordingly receive a more vigorous treatment. The ends of the clamping bars, which may carry pivoted and threaded appendages, are conveniently off-set axially of the drum ends to thereby escape most of the blasting. In addition, these ends may also be off-set radially of the drum so that they are even further out of range of blastant particles bouncing from the drum.

As also indicated in Fig. 1, the apparatus can be equipped with one or more spray nozzles 99 by means of which the drum periphery and/or sheets being blasted can be washed off either continually or intermittently during the blasting or after the blasting is completed and the sheets are to be removed or a new sheet mounted. Washing in this manner cleans up the sheets, the clamping mechanism and the drum. If desired, the washing can be repeated before a new sheet is placed on the drum in order to assure that abradant particles are not trapped between the sheet and the drum.

According to a further embodiment of the present invention, the mechanical clamping portions of the anchoring bars 54 can have all their movable portions underneath or within the confines of flange 66 so that they are thereby shielded from the blast. As indicated above, one of the clamping jaws 68 may be fixed with respect to the bar on which it is carried. The tapered engagement between the jaws and the flange 66 will then automatically enable tightening at both jaws when only the movable one is forced in place.

As many apparently widely different embodiments of this invention may be made without departing from the spirit and scope hereof, it is to be understood that the invention is not limited to the specific embodiments hereof except as defined in the appended claims. Thus, for example, other variations in the mechanical clamping features may be made to render them more rapidly applicable, as is well known.

What is claimed is:

1. In a clamping apparatus for holding sheets on a cylindrical drum, an elongated clamp bar, securing jaws projecting laterally adjacent each end of said bar for securing one face of the bar against a cylindrical portion of the drum, an expandible tube held by said bar alongside and recessed with respect to said face, supporting elements supporting the back of the tube, fluid supply structure connected to said tube for supplying fluid at an elevated pressure, said fluid supply structure including control means by which the supply of fluid to the tube can be established to expand the tube against said supporting elements and cause it to securely clamp to the cylindrical drum portion anything that is inserted between it and said drum portion.

2. In a blasting apparatus for subjecting sheets to the action of a stream of abrasive particles, a cylindrical work-holding drum rotatably mounted on an axially positioned shaft, at least one clamp bar adjustably held in axially-directed position against the drum exterior, an expandible tube held by each bar close to the external drum surface, each bar having a backing wing supporting its tube on the side opposite the drum surface, fluid supply structure connected to said tube for supplying it with fluid at elevated pressure, said supply structure including manipulatable control means connected to establish the fluid supply and thereby cause the tube to be expanded and tightly grip a portion of a sheet inserted between it and the carrier, and operating mechanism connected to rotate the drum around its axis.

3. The combination of claim 1 in which the recessing of the tube is just sufficient to position the outer face of the unexpanded tube as an article-holding friction grip at about the same level as the face of the clamp bar.

4. A clamping apparatus for holding articles in a number of places around the periphery of a rotating drum, an arcuate fluid-conducting manifold having a predetermined number of outlets, supply elements connected to the manifold for supplying fluid under pressure, an elongated clamping bar having securing jaws adjacent either end for adjustably fastening a face of the bar to the drum periphery, said bar carrying an expandible tube alongside said face, and supporting elements supporting the back of the tube, connection structure for selectably connecting said tube to one of the manifold outlets, and control means connected to the supply elements for manipulation to cause the fluid to be supplied to the connected tube and inflate said tube to clamp the face of the tube against the drum.

5. A rotatable work-holding drum structure including a cylindrical drum, an elongated clamping bar having securing jaws adjacent either end for adjustably fastening a face of the bar to the drum periphery, said bar carrying an expandible tube alongside said face, and supporting elements supporting the back of the tube, rotatable fluid supply structure mounted for rotation with the drum and connected to supply fluid under pressure to the tube to expand it so that its face pinches against the drum any work piece that is positioned between the tube and the drum.

6. The invention of claim 5 in which the tube is held with one face recessed down to about the level of the drum engaging face of the clamping bar.

References Cited in the file of this patent

UNITED STATES PATENTS

| Number | Name | Date |
|---|---|---|
| 1,312,615 | Cooper | Aug. 12, 1919 |
| 2,005,654 | Fritsche | June 18, 1935 |
| 2,600,127 | Reaser et al. | June 10, 1952 |